United States Patent [19]

Wood

[11] Patent Number: 4,696,685
[45] Date of Patent: Sep. 29, 1987

[54] FILTER BAG PREPARATION

[75] Inventor: James Q. Wood, Bartlesville, Okla.

[73] Assignee: Phillips Petroleum Company, Bartlesville, Okla.

[21] Appl. No.: 772,980

[22] Filed: Aug. 30, 1985

[51] Int. Cl.⁴ ............................................. B01D 46/00
[52] U.S. Cl. ............................................. 55/97; 55/524; 423/450
[58] Field of Search .............. 55/96, 97, 524; 23/314; 423/450, 458

[56] References Cited

U.S. PATENT DOCUMENTS

| | | | |
|---|---|---|---|
| 3,075,829 | 1/1963 | Latham | 423/450 |
| 3,464,184 | 9/1969 | Wright | 55/97 |
| 3,521,428 | 7/1970 | Dollinger | 55/97 |
| 4,191,542 | 3/1980 | Cheng | 55/97 |
| 4,309,400 | 1/1982 | Murray | |
| 4,396,590 | 8/1983 | Cheng | 55/97 |
| 4,464,184 | 8/1984 | Cera et al. | 55/97 |

FOREIGN PATENT DOCUMENTS

| | | | |
|---|---|---|---|
| 707684 | 4/1965 | Canada | 55/97 |
| 507337 | 8/1976 | U.S.S.R. | 55/96 |

OTHER PUBLICATIONS

Kirk Othmer—Third Edition, vol. 4, pp. 631–664, dated 4/27/82, Carbon Black, John Wiley & Sons, New York.

Primary Examiner—Bernard Nozick
Attorney, Agent, or Firm—A. W. Umphlett

[57] ABSTRACT

Carbon black filter bags are heated and then pretreated with "dry" carbon black to extend the life of the filter bags.

7 Claims, 1 Drawing Figure

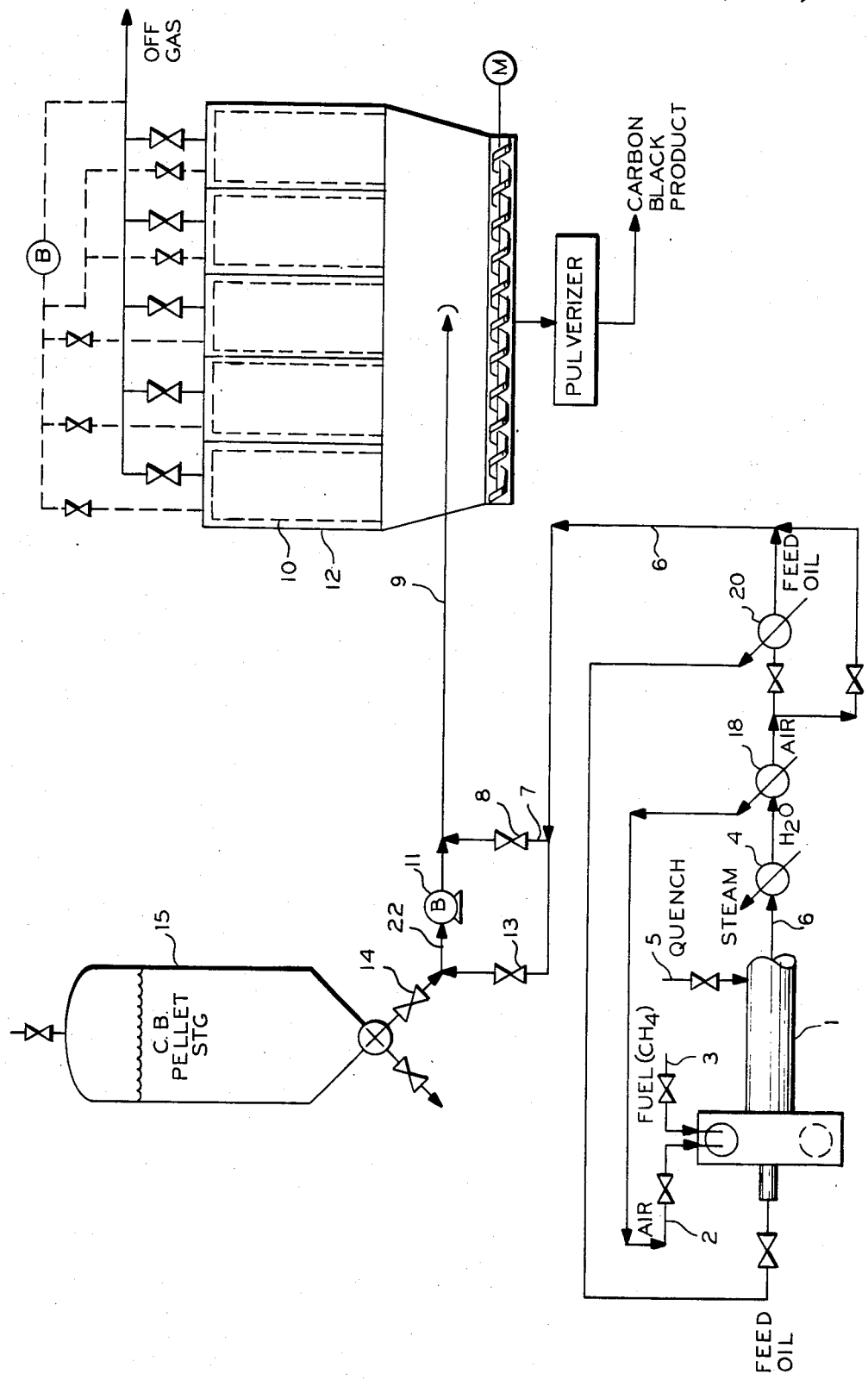

FILTER BAG PREPARATION

This invention relates to carbon black production. In one aspect this invention relates to a method for startup of a carbon black plant. In a particular aspect, this invention relates to the preparation of new filter bags used in a carbon black plant.

Systems for producing of carbon black by partial combustion and/or thermal decomposition are well known. Basically, the components of a carbon black producing system include a highly specialized furnace, called a reactor which also includes a quenching system for lowering the temperature of reactor products and a collection means which includes one or more units for recovering carbon black from the reactor products.

In the collection means, as in many means of this sort, there exists the problem of removing suspended solids from a stream of gas which is to be vented to the atmosphere or to off gas systems. Various designs of different types of filtering equipment have been developed and are in use at the present time. One type of filtering apparatus used is a "bag filter". Smoke or solids laden gases pass through these fabric bags which are maintained in an inflated state by the passage of the gases being filtered.

The bag filters used in carbon black plants today all have a common problem with regard to the black being retained within the fibers of the filter bag cloth as the time in service increases. This gradually reduces the porosity of the bags and eventually reduces the filter capacity to the point where the filter bags must be replaced. This usually occurs after about 18 months of service life, although this time varies between plants.

To understand the instant invention it is necessary to understand the carbon black art in general. Precursors to carbon black are generally very high molecular weight aromatic polymers. Very minor amounts of these hydrocarbon compounds remain on the produced raw carbon black particles that enter the filter. A way to determine the amount of these compounds on the raw carbon black particles is to measure the photelometer of the particles. The lower the photelometer of the raw black, the higher the concentration of these higher molecular weight aromatic hydrocarbon polymers on the black particles. This raw carbon black, with the attached polymers, is more sticky and more difficult to flush or backflow out of the bag cloth during the cleaning cycle, than aged or finished product black. As a result the filter bags generally lose their porosity until replacement is required. The final product, aged black, has a much higher photelometer (i.e., a much lower concentration of high molecular weight hydrocarbon polymers) than the raw black from the reactor and is therefore not nearly as sticky as the raw black.

Therefore, the object of this invention is to provide a process for extending the life of filter bags in a carbon black process. Another object of this invention is to provide a method for reducing the amount of sticky or raw carbon black being impregnated on new filter bags. Other objects of this invention will become apparent from the following description of the invention.

SUMMARY OF THE INVENTION

According to the instant invention, when a filter bag house is fitted with new filter bags, the bags are pretreated to increase the length of bag service. The first step in this pretreament process is to charge the bags with a hot gas, preferably from the carbon black reactor (absent feedstock) until the bags have reached operating temperature. This is generally about 450° F. to about 550° F. Once the bags have reached this temperature, a high photelometer (dry) carbon black from storage is added to the gas to pretreat the bags.

After the bags have been pretreated for a sufficient time, normal operation is resumed with feedstock charged to the reactor to produce carbon black, which is then filtered from the reactor effluent using these pretreated filter bags.

DESCRIPTION OF THE DRAWING

The FIG. shows a carbon black process that can utilize the instant invention.

DETAILED DESCRIPTION OF THE INVENTION

In accordance with the instant invention, hot gases, such as combustion gases from the carbon black reactor (absent feedstock), are used to heat new or substantially clean filter bags to the operating temperature of a carbon black process. In the preferred embodiment, the hot gas is generated using fuel and air, fed through the carbon black reactor, but the hot gas can be derived from any source. If the reactor is used, a minimal of excess air is used so as to minimize free oxygen that passes from the reactor into the bag filters. Preferably, a fuel rich mixture is utilized for a safe operation.

The reactor effluent which is generally at a temperature ranging from about 2800° to about 3000° F., is then quenched with water so that the hot gases passing from the reactor to the bag filter heat the filter bags to a temperature ranging from about 450° F. to about 550° F. The flow of gases is continued until te bag filters are in this temperature range.

At this point a portion of the gases is diverted to convey carbon black pellets from the storage area to a blower to pulverize the pellets and the pulverized pellets plus the gas are passed to the bag filters to pretreat the new bags with this black.

The pulverization of pellets into smaller particulate carbon black can be accomplished through any conventional manner. A preferred method comprises feeding the pellets through a blower. Another method consists of feeding carbon black pellets through a micropulverizer.

The bag filters utilized in this invention can be any conventional filter bags used in conventional bag houses. Bags can be made of any suitable material, such as, for example, glass fibers, Ryton ®, or Teflon ®.

The black used to pretreat the filter bags can be any conventional "dry" black. Preferably it is the type of black produced from a wet pellet dryer. This black has a photelometer of at least about 90 (a "dry" black), and even a slight oxidation of the black can have occurred in the wet pellet dryer. Such blacks preferably are the so called "soft" blacks such as ASTM grade N550 or N660. Carbon blacks from the ASTM grade N300 series, for example, N330 can also be used for this precoating.

The precoating is carried out for about 1 to 2 hours to deposit an amount of black equivalent to about 1 standard filter cycle. The amount of black present in the carrying gas should range from about 2.0 to about 5.0 pounds of black per 1,000 standard cubic feet (SCF) of gas used. A preferred range is about 3.5 pounds black per 1,000 SCF of gas used. At that range, about 1 hour pretreatment is effective in increasing the bag life about 10 to about 20 percent. The average life of a filter bag is generally around 18 months so the bag life would be increased 2 to 4 months through this pretreatment process.

After the pretreatment period, the black addition is ceased and conventional furnace operation is started to produce the desired black (smoke) which, after being quenched, heat exchanged, etc. to a temperature ranging from about 450° F. to about 550° F. is passed to the bag filter for standard filter operation.

In another embodiment of this invention, an additional amount of aged or dry black is circulated along with the carbon black containing effluent from the reactor. This embodiment will increase the life of a filter bag an additional five percent. In general, the stream of raw black produced should contain at least from about 4 percent to about 5 percent of added dry black. The amount of dry black could be increased if desired but would not be economical.

The following is a description of the preferred embodiment.

The FIGURE shows a typical carbon black process utilizing the instant invention. To perform the pretreatment operation on new filter bags, air and fuel are introduced into the carbon black reactor 1, through lines 2 and 3. Air can be introduced at about 200,000 SCF/hr. Fuel can be introduced at about 22,000 SCF/hr. No feed oil is introduced to the reactor during the pretreatment process.

The hot combustion gases leave from the reactor 1 by line 6, are cooled with water quench 5 and the following heat exchanger equipment down to a temperature ranging from about 600° F. to about 700° F. immediately downstream from the oil preheater. Line 6 extends from the reactor through waste heat boiler 4, air preheater 18, feed oil preheater 20 to line 22 from carbon black pellet storage tank 15. Line 22 connects storage tank 15 to blower or micropulverizer 11 which discharges to bag house 12 through line 9. Line 7, containing valve 8 connects line 6 to line 9 bypassing storage tank 15 and blower 11. Filter bags 10 are preheated to operating temperature, which again is around about 450° F. to about 550° F. through either line 6, 7, and 9 or through lines 6, 22, and 9.

In the initial operation, the bags are preheated when the valve 13 is closed, valve 8 is open, and the combustion gases pass from line 6 through line 7 to line 9 into bag house 12 and into bags 10.

Once the bags have reached operating temperature, valve 13 is opened and then valve 8 is closed and "dry" carbon black pellets from storage 15 are released into line 22 through valve 14 and blower 11, to be pulverized in blower 11 and then the mixture of pulverized carbon black and combustion gas passes along line 9 to the bag house 12.

After the bags 10 have been fully treated, conventional furnace operation is continued, with valve 13 closed, valves 14 on the dry carbon black storage closed and valve 8 open. Feed oil is introduced into the carbon black reactor 1 and the carbon black process then operates as generally disclosed in the art.

In an embodiment of this invention, during normal carbon black process operation, valve 14 is open with valve 13 open partially and some "dry" carbon black is mixed with the "raw" carbon black produced in the reactor. The two are mixed at the intersection of lines 7 and 9. The addition of "dry" carbon black in this manner increases the life of the filter bags.

The above is intended only to give one embodiment of the instant invention. It is not intended to limit the invention to this one embodiment. Other embodiments can be had within the scope of this invention.

I claim:

1. A process for extending the life of bags used as filters in a carbon black process, comprising the steps of (1) preheating new bags with carbon black free hot gases until the bags reach operating temperature (2) flowing particle dry carbon black having a low aromatic content and a photelometer value of at least about 90 in a hot gas carrier into said bags for a length of time sufficient to provide the bags with a coating of dry carbon black and (3) thereafter filtering carbon black process effluent.

2. A process according to claim 1 where dry carbon black is added with the effluent from a carbon reactor during the operation of said carbon black process.

3. A process according to claim 1 where said new bags are preheated to a temperature ranging from 450° F. to about 550° F.

4. A process according to claim 1 where said dry carbon black is introduced to said filter bags at a rate ranging from about 2.0 to about 5.0 pounds black per 1,000 SCF of gas for a time ranging from about 0.5 to about 2 hours.

5. A process according to claim 1 where said hot gas comes from reacting fuel and air in a carbon black reactor, without carbon black feedstock, and cooling the thus produced gas.

6. A process according to claim 1 where said carbon black is chosen from N550, N660 and the N300 series.

7. A process according to claim 6 where said carbon black is N330.

* * * * *